United States Patent [19]

Varney et al.

[11] Patent Number: 4,637,376

[45] Date of Patent: Jan. 20, 1987

[54] HIGH EFFICIENCY SOLAR HEATER

[76] Inventors: J. Arnold Varney, 7326 Ogelsby Ave., Los Angeles, Calif. 90045; Frederick M. Varney, Rte. 9, Box 89FV, Santa Fe, N. Mex. 87501

[21] Appl. No.: 752,923

[22] Filed: Jul. 8, 1985

[51] Int. Cl.$^4$ .............................................. F24J 3/02
[52] U.S. Cl. .................................. 126/451; 126/417; 126/450; 126/419
[58] Field of Search ............... 126/451, 450, 438, 419, 126/417

[56] References Cited

U.S. PATENT DOCUMENTS

| | | | |
|---|---|---|---|
| 3,391,688 | 7/1968 | Dery | 126/451 |
| 4,150,659 | 4/1979 | Buckley | 126/422 |
| 4,284,071 | 8/1981 | Steinberg | 126/451 |
| 4,292,957 | 10/1981 | Golder | 126/451 |
| 4,396,004 | 8/1983 | Koenig | 126/418 |
| 4,422,443 | 12/1983 | Arendt | 126/422 X |
| 4,446,854 | 5/1984 | Clevett et al. | 126/451 |

*Primary Examiner*—Larry Jones
*Attorney, Agent, or Firm*—Beehler, Pavitt, Siegemund, Jagger, Martella & Dawes

[57] ABSTRACT

A heating chamber is defined by canted side walls in inverse pyramidal configuration, the base of the pyramid being open for admission of sunlight and the tip of the pyramid being truncated by a bottom plane. The chamber is adapted to positioning with the aperture plane generally normal to the rays of sunlight so that the canted walls may be fully and simultaneously exposed to sunlight. The inner wall surfaces are dull-blackened to enhance conversion of shortwave solar energy to long-wave or infrared energy whereby the walls are heated so as to radiate infrared (heat) energy for transfer of such heat energy to objects or materials which may be positioned within the heating chamber. The chamber aperture is closed by translucent material such as glass for enhancing the heating effect of the black interior wall surfaces. The aperture closure may rest freely over the aperture or may be hinged along one edge for convenience of opening for access to the interior of the chamber. The chamber walls are preferably insulated exteriorly to inhibit conductive loss of thermal energy from the chamber. The effective aperture area may be increased by positioning reflective surfaces exterior of the heating chamber so as to direct additional sunlight against and substantially perpendicular to the black interior walls of the chamber whereby the temperature of such walls is further raised through absorption of solar energy and conversion thereof to heat for infrared radiation within the heating chamber.

5 Claims, 10 Drawing Figures

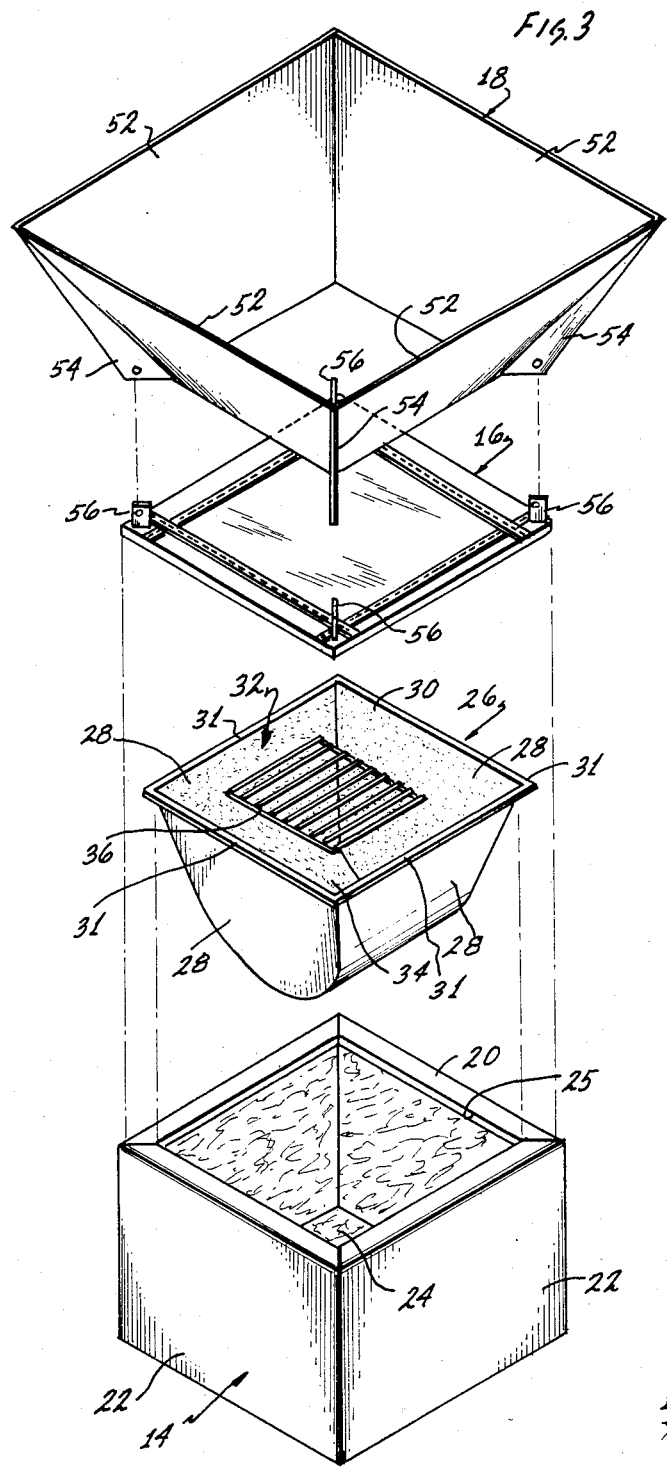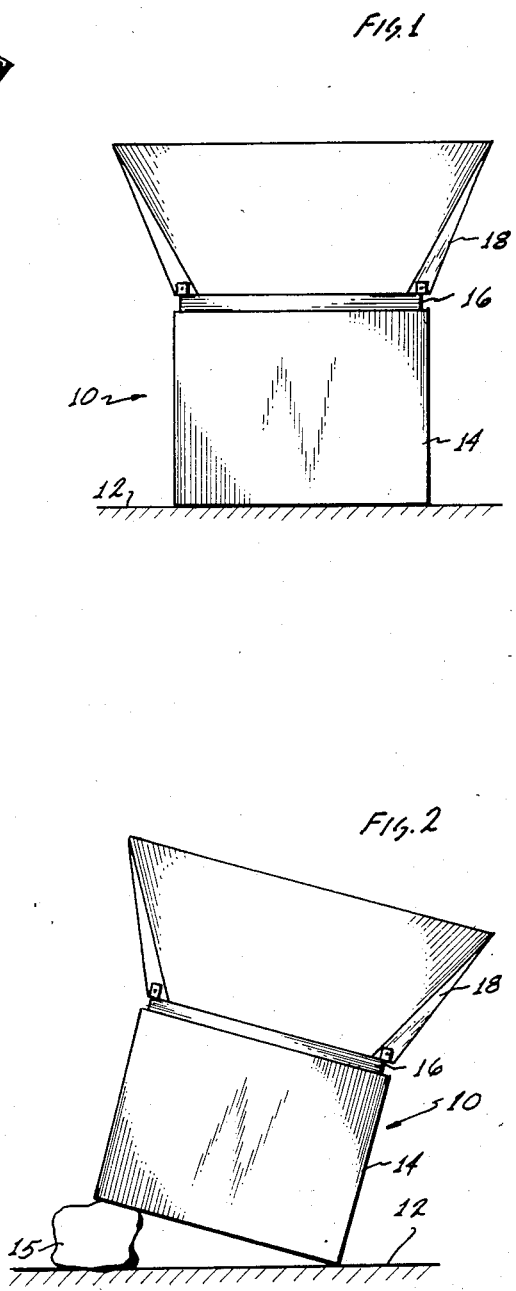

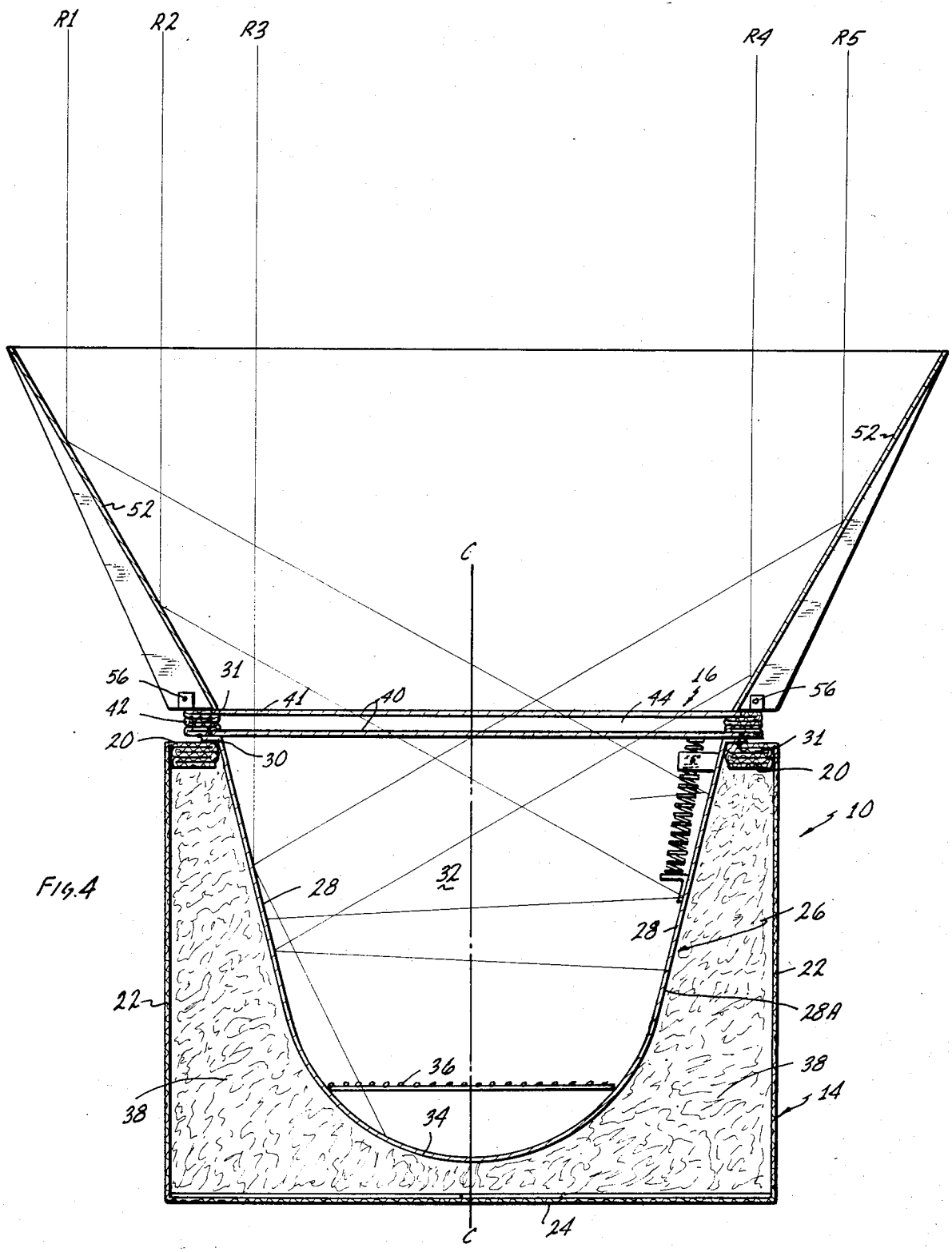

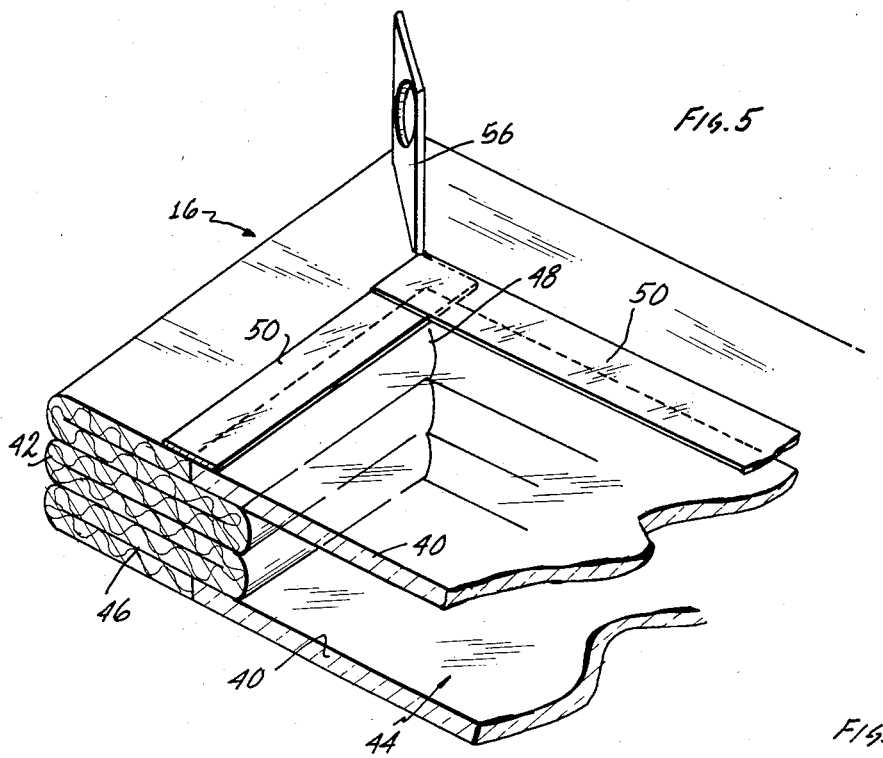
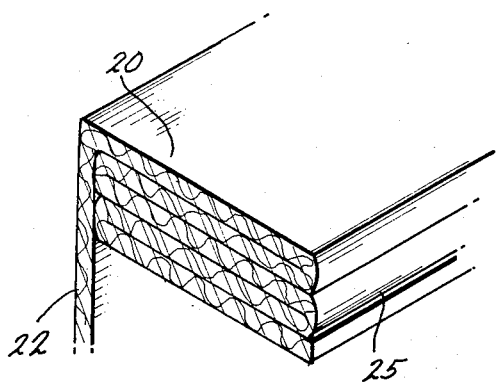
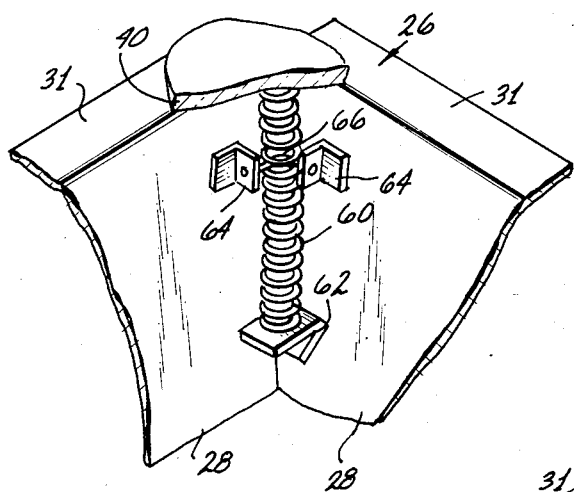
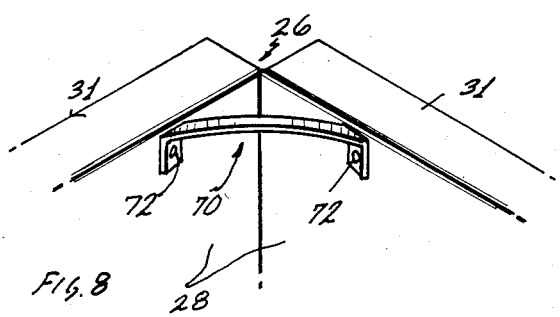

CURVE OF 4TH POWERS OF "BLACK-BODY" TEMPERATURES

HIGH EFFICIENCY SOLAR HEATER

BACKGROUND OF THE INVENTION

1. Field of the Invention

The invention relates generally to kilns and is more specifically directed to solar energized ovens or chambers for thermally processing substances or objects as for cooking, drying, curing, carbonizing, etc.

2. DESCRIPTION OF THE PRIOR ART

Solar energized ovens are known to comprise insulated enclosures into which sunlight may be directed through translucent window-like closure panels for heating the air within such ovens. The air serves as a working fluid for conductive transfer of heat to a substance introduced within such an enclosure, such as food to be cooked. Such art is taught in U.S. Pat. Nos. 4,446,854 and 4,130,106 to Clevett; and 3,391,688 to Dery. One problem with such ovens is that air represents a relatively inefficient heat transfer medium so that even though the air may be quite hot, the transfer of heat from the air to the material to be heated is poor and consequently time-consuming. The heat transfer problem from heated air is exacerbated by the fact that solar heaters or cookers are sealed to prevent loss of hot air and consequently the air in the chamber tends to be stagnant. Thus, a boundary layer of cooler air forms at the interface between the relatively cool substance or object to be heated and the static surrounding hot air mass, such boundary layer thus ihibiting conductive heat transfer to the material to be heated.

SUMMARY OF THE INVENTION

The present invention improves over the prior art by providing a solar-energized oven or kiln having a heating chamber in the shape of an inverted pyramid defined by canted side walls and provided with a movable translucent closure panel disposed in a plane substantially normal to the centerline of such pyramidal configuration. When positioned relative to the sun so that the centerline of the pyramidal chamber lies generally parallel to the rays of sunlight, the inner surfaces of the chamber are fully and simultaneously exposed to sunlight. The inner surfaces of the chamber are treated so as to be dull black or other color and texture adapted to efficient absorption of solar energy. Means may be provided in the bottom of the chamber for convenient leveling of a container, as for food to be cooked, placed within the chamber, regardless of the angular relationship of the centerline of the pyramidal chamber relative to horizontal. Thus, if the chamber or oven or kiln is inclined considerably to face the sun, which may be substantially away from the zenith or low over the horizon, a cooking vessel within the chamber may be maintained substantially level, for instance, to avoid spillage of liquid. Such means may comprise a concavely curved chamber bottom on which a container may be placed in an erect attitude irrespective of inclination of the chamber. In the alternative, self-leveling support means may be provided, such as a rack suspended pendulum-fashion from above so as always to seek the horizontal regardless of attitude of the chamber relative to the zenith.

As a further alternative for self-leveling of containers placed within the heating chamber, arcuate rail-like structures may be positioned so that a tray or rack resting on such rails through the medium of anti-friction means, like rollers, will always seek the horizontal when an object placed thereon is located so that its center of gravity is directly over or under the center of gravity of the tray or rack. A further convenient method of leveling a rack or tray placed on the aforementioned concavely curved chamber bottom is to provide a pendulum-like visual reference attached to such rack or tray so that a person moving the rack or tray toward a horizontal attitude may readily observe when such horizontal attitude is realized. An alterative to such a pendulum-like visual reference is to provide a ball free to roll on a slightly arcuate race attached to or integral with the tray or rack so that when the tray or rack is substantially horizontal, the ball may be observed to be essentially centered between the ends of such race. Such an aid to leveling of a tray or rack means within the heating chamber permits such tray or rack to rest frictionally on arcuate rails or on a concavely curved chamber bottom, thus minimizing need for positioning an object or container placed on the rack or tray so that the center of gravity of such object or container lies close to a vertical plane passing midway between supporting edges of such tray or rack. In this non-self-leveling rack or tray arrangement, it is apparent that whenever the overall heating device or oven or kiln is rotated or repositioned in elevation to face the sun as the earth rotates, a person tending the device must move the rack or tray to maintain its substantially horizontal attitude within the oven or kiln. This may be readily accomplished by means of a suitable tool with which to grasp or engage the tray or rack for such repositioning.

As indicated above, the inner walls of the kiln are rendered highly solar energy absorbent, preferably by blackening with a dull, non-reflective finish capable of withstanding high temperatures such as over 500 degrees F. The outer surfaces of the chamber walls, which are preferably of metal, are treated to maintain a relatively shiny, polished, reflective surface so as to inhibit radiant energy loss from such outer surface. Thus, the walls of the kiln tend to become very hot when exposed to sunlight. By insulating the outside with heat resistant material such as fiberglass or other refractory insulating substance the kiln walls may be further heated by minimizing conductive heat loss to the environment. By providing a translucent closure panel to lie across and substantially seal off the aperture of the inverse pyramidal kiln configuration, convective and conductive heat loss from within the kiln chamber may be minimized. A double glazed panel for this purpose has been found highly effective. If the inner glazing member is a glass treated or formulated to reflect infrared energy, radiant energy emitted by the "black-body" inner walls of the kiln may be kept largely within the chamber, further enhancing radiant energy heating both of the chamber walls themselves and of any object or substance positioned within the chamber. By treating or processing or formulating the outer surface of the outer glazing member of the aperture closure, reflection of sunlight from such surface may be minimized, thereby maximizing passage of solar energy or sunlight through the aperture closure into the kiln interior and on to the "black body" absorbing walls of the chamber.

With no augmentation of solar energy received by the heating chamber walls, that is, without additional exterior reflector panels to increase the amount of solar energy captured, we have found in our solar kiln the ability to heat materials quite sufficiently for cooking in reasonable time. We have determined that transfer of infrared energy from the heated "black-body" radiant walls of our kiln to substances, materials and objects within the kiln is, in fact, substantially, and probably the primary mode of heating of such substances to temperatures suitable for cooking, dessicating, or curing, for instance, as opposed to conductive heating from the heated air mass within the heating chamber.

The infrared heat transfer process may, of course, be enhanced by positioning reflective collector panels or other means to deflect sun's rays through the aperture of our solar heating device. Such alternative means may comprise Fresnel lens-like light refracting means for capturing rays of solar energy over an area substantially larger than the area of the aperture itself. Temperatures of the "black-body" walls of the kiln may readily be elevated to carbonizing levels so that, wood for instance, or other cellulose materials may be converted to charcoal by providing a somewhat reducing atmosphere within the kiln. It should also be noted that such enhancing means may also be employed to advantage during conditions of relatively poor insolation, such as in hazy weather, when clear, spectral sunlight is not available.

The importance of such infrared heating may be understood by reference to the Stefan-Boltzman Law applicable to ideal black-body absorbing and radiating surfaces. Such surfaces follow the relationship set forth in the expression I equals T raised to the fourth power, where I represents the rate of radiation in question and T represents the "black body" temperature in degrees Kelvin (temperature above absolute zero). Thus if the absolute temperature of a perfectly "black" body is doubled, its radiation is increased sixteen fold. In the practical case of our kiln, by raising the kiln wall temperature from e.g. 300 degrees F. to 450 degrees F., we more than double the infrared radiant energy emission from such walls as indicated by the curve plotted in FIG. 8. Radiation so emitted can be absorbed by material within the kiln and effectively heated with great efficiency.

As indicated above, "black body" radiating effects can be further enhanced by provision of additional solar reflective panels or refractive means positioned exterior of the kiln aperture so as to reflect or deflect sun's rays impinging on such panels through the aperture glazing and onto the "black-body" walls. By canting the walls of the kiln at an angle substantially as shown in the drawings and by canting reflective panels also as shown herewith, a synergetic relationship is established between the cavity walls and such external light-deflecting means so that sunlight reflected from such panels falls on the "black-body" absorbing walls of the kiln at substantially right angles or normal thereto, whereby essentially maximum efficiency of the solar energy conversion process is realized. It should be noted that our device achieves additive effects of both direct rays of light passing through the aperture and indirect rays deflected by the collector panels, thus realizing significantly higher temperatures of the "black body" chamber walls then previously realized in the solar oven or carbonizing of wood, as for production of charcoal, have been achieved.

Because of the unusually high temperatures achieved in applicants' device, it has been found important to provide means for limiting temperature rise within the kiln, to avoid burning of materials or excessive heating of the kiln itself. Such means may comprise, for instance, thermally responsive devices functioning to open a port or ports at some predetermined temperature, to admit outside air and to allow escape of internal hot air. Such means may comprise a compression spring restrained against extension by a fusible element such as solder formulated to melt at a predetermined temperature such as 400 degrees F. (205 degrees C.), thus allowing the spring to extend and open a port e.g. as by lifting the glazed aperture closure member itself away from the chamber walls. Such fusible element may be shielded against radiant energy heating so that only air temperature within the kiln is effective to melt the fusible element at its critical temperature. In lieu of such a fusible element, an organic (cellulose) dowel may be employed to restrain the preloaded spring. Such a dowel will lose strength due to charring at temperatures in the order of 400 to 450 degrees F., thus allowing the compressed spring to extend so as to lift the aperture closure. In applicant's preferred embodiment of the invention, the translucent aperture closure simply rests on or may be hinged to one of the upper edges of the chamber walls which define the chamber aperture. By mounting the thermally responsive temperature limiting means under a free edge of the aperture closure and inside the kiln chamber, it is apparent that, once released from its compressed state, such a spring can jack open the aperture closure to some extent if the spring is of such spring rate as to be capable of lifting the aperture closure member. An alternative, simpler thermal relief means comprises a bi-metallic element positioned so as to raise the aperture closure somewhat as such bimetallic element deflects when heated.

A primary object of the invention is to create a solar kiln capable of heating objects and materials and substances placed within the heating chamber to a major if not primary extend by effects of direct "black-body" radiation from hot interior walls of such a kiln.

Another object of the invention is to accelerate the process of heating materials or objects placed within the kiln well beyond that rate of heating achievable through conductive heat transfer employing air in the kiln as a working fluid.

Another object of the invention is to permit use of containers, such as for water heating, with "black-body" infrared energy-absorbing outer surfaces whereby such heating can be accelerated and rendered effective even at moderate over air temperatures.

A further object of the invention is to permit effective cooking, for instance, by solar energy without resort to concentration of sunlight as by external reflecting or refracting collector surfaces designed to deflect sunlight through a glazed aperture.

A further object of the invention is to minimize the well as their tendency to lose efficiency by becoming dusty or soiled or by deteriorating over a period of time, is rendered less problematic.

A further object of the present invention is to eliminate the danger of over-heating of the kiln chamber itself or of materials to be heated within the chamber.

A further object of the invention is to provide structurally sound means for concentrating sunlight when conditions of insolation, that is, intensity of solar energy received by the kiln, are relatively poor as in partially overcast weather or when the sun is low over the horizon as in winter or early or late in the day.

A further object of the invention is to permit effective heating of objects such as wood or certain foodstuffs for drying thereof even though the kiln may be vented for allowing moisture driven off to escape from the kiln.

A further object of the invention is to achieve carbonizing temperetures as required for production of charcoal in a reducing atmosphere within the kiln.

DESCRIPTION OF THE DRAWINGS

FIG. 1 is a side elevational view of a solar oven, constructed according to the present invention.

FIG. 2 is a side elevational view of the oven of FIG. 1., shown in a typical use position, inclined so as to optimize reception of solar radiation.

FIG. 3 is an exploded perspective view of the solar oven.

FIG. 4 is a vertical cross section of the oven showing the insulated oven cavity and the supplementary exterior reflector surfaces mounted thereon.

FIG. 5 is a fragmentary perspective view, showing a preferred double glazed cover for the oven chamber.

FIG. 6 is a fragmentary cross sectional detail view of the upper rim of a cardboard enclosure for the novel oven.

FIG. 7 is a detail view showing a spring operated device for venting the oven chamber at a predetermined temperature.

FIG. 8 shows an alternate, bi-metallic device for venting the oven chamber at a predetermined oven temperature.

DESCRIPTION OF THE PREFERRED EMBODIMENTS

Figure 10:
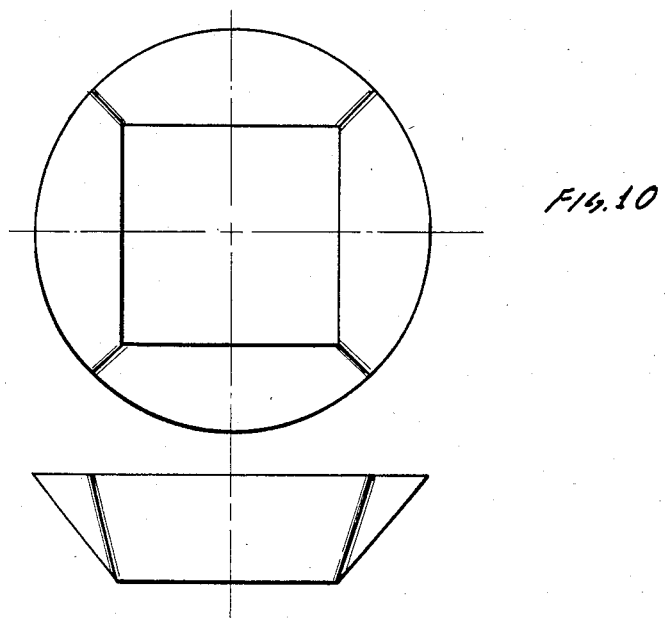
FIG. 10 shows an alternate reflector panel of conic secton configuration.

With reference to the drawings, FIG. 1 shows a solar energized oven or kiln pan placed on a ground surface 12 and comprising a rectangular enclosure 14, a translucent closure or covering 16 and an arrangement of external reflectors 18.

The inter-relationship of the various components will be better understood by reference to FIG. 3. The oven enclosure 14 in the presently preferred embodiment is constructed out of corrugated cardboard, preferably weatherized cardboard of the type commonly used by the military and which is substantially moisture proof and will withstand a moderate level of outdoors exposure. The enclosure is a rectangular box, including an upper support frame 20 extending along the upper ends of four enclosure walls 22 and further including an enclosure bottom 24. An oven chamber unit 26 is constructed of sheet metal and has an inverse pyramidal shape defined by four canted side walls 28. The upper edges of the four side walls 28 define the base of the inverted pyramid and form a rectangular aperture 30 into the heating chamber 32. The bottom of the chamber 32 is closed by a concavely curved chamber bottom 34 on which may be placed a rack 36 made of metal wire or other suitable construction for supporting a cooking container within the oven chamber, as best understood by reference to FIG. 4.

The chamber unit 26 is provided with laterally extending flanges projecting outwardly from the upper edges 30 of the chamber walls 28. The chamber unit 26 is suspended by means of these flanges 31 within the top opening 25 of the oven enclosure 14, thus defining an insulation space 38, which may be left empty, such that the air trapped therein serves as insulation for the chamber walls 28 or preferably is filled with thermally insulating material such as fiber glass or kapoc fiber or foamed plastic of suitably temperature-resistant qualities.

The upper aperture 30 of the chamber unit 26 is closed by a transparent rectangular cover 16 which may comprise two sheets of glass 40 spaced apart by a wood, metal or corrugated cardboard frame 42 so as to define a dead airspace 44, whcih improves the insulating characteristics of the cover by inhibiting conductive heat loss therethrough. The assembly of the cover 14 is best understood by reference to FIG. 5. The rectangular frame 42 is made by multiple folds 46 of corrugated carboard mitered at 45 degrees angles at each end to form corners 48. The top and bottom folds 46 of cardboard terminate short on the inner side of the frame to define recessed areas for accepting the edges of the glass sheets 40. The two glass sheets are secured to the frame, e.g. as by taping 50 along the edges employing adhesive tape of suitably temperature resistant qualities. The double glazed cover 16 may simply rest on the flanges 31 of the chamber unit 26 suspended from the upper frame 20 of the enclosure 14, thereby closing the chamber 32. Hinge means or stop means may be provided to prevent cover 16 from sliding off enclosure 14 when enclosure 14 is canted as illustrated in FIG. 2.

An external reflector unit 18 includes 4 reflector surfaces 52 joined along their edges by flange portions 54 into a truncated inverted pyramid open at top and bottom. The narrower bottom portion is secured to the translucent cover 16 by means of four tabs 56 fixed at each corner of the frame 42 of the cover 14. Each tab 56 is secured to one of the reflector flanges 54 by any suitable means, which are preferably readily detachable so as to allow easy and quick attachment and disengagement of the reflector unit 18 to and from the cover 16 as circumstances and available solar radiation may require.

External reflector unit 18 may comprise four panels such as reflector surfaces 52 but of arcuate or conic configuration as shown in FIG. 10. Rays of sunlight falling on the corner area of reflector unit 18 will then be deflected directly through the aperture rather than off an adjacent reflector surface and then through the aperture. Such conic section panels are intrinsically stable structurally, a distinct advantage when the reflector unit is subjected to gusty winds.

The upper frame 20 of the oven enclosure 14 may be formed by multiple folds of the corrugated cardboard at the upper end of the enclosure wall 22 and mitering the folded portions to make a rectangular frame as shown in FIG. 3.

Alternatively frame 20 may be fabricated of wood as in common picture frame practice. Such a frame may be provided with internally disposed grooves into which the edges of glass panes may be inserted for holding such panes or other glazing material.

The chamber walls 28 are mutually perpendicular so as to form a rectangle in horizontal cross section, and each wall 28 is canted at approximately 70 degrees to the horizontal plane, i.e. to the plane of the closure 16. Each of the external reflecting surfaces 52 are arranged at an angle relative to the plane of the closure 16 somewhat greater than 70 degrees and such as to cause rays of sunlight R1, R2, R3, R4 and R5 parallel to the center line CC in FIG. 4 to reflect off of the surfaces 52 and impinge against the chamber walls 28, substantially at right angles thereto.

The right angle of incidence of the additional solar radiation provided by the reflecting surfaces 52 maximizes absorption of the additional solar radiation by the chamber walls 28 and thus maximizes the temperature rise of the chamber walls due to such additional solar radiation. The outer surface 41 of the top glass sheet 40 of cover 16 may advantageously be treated so as to minimize reflection of sun rays impinging upon it after reflection from reflector surfaces 52, so as to maximize the amount of solar radiation entering the cavity 32 through the cover 16. Further, one or both of the sheets 40 may be formulated or treated to minimize transmission of infrared radiation outwardly from the oven cavity 32, so as to maximize the temperature of the chamber walls 28.

It will be appreciated that due to the canting of the cavity walls 28, when the center line CC of the oven unit is pointed towards the sun, the entire surface of all four walls 28 will be exposed simultaneously to solar radiation and will thus maximize absorption of solar radiation by the walls 28. The oven 10 may be used with or without the supplementary reflector unit 18, depending on the amount of heat or oven temperature required for the task at hand and on the amount of solar radiation available at a particular time of day or time of year or particular weather conditions.

Figure 9:
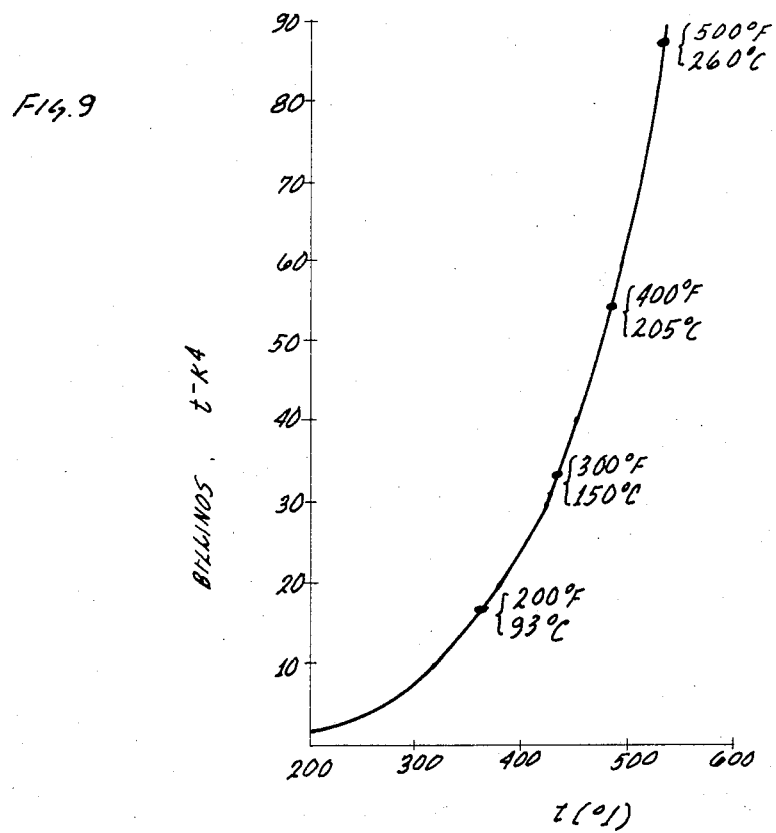
FIG. 9 is a curve illustrating the relationship between black body temperature and radiation emitted by the sheeted black body.

The inner surfaces of all four walls 28 are blackened to a dull black finish by any suitable means, for example by painting with commercially available black "barbecue" or engine exhaust manifold paint, which is formulated to withstand elevated temperatures. The bottom 34 of the chamber may likewise be so covered. The inner chamber surfaces thus covered form a black body radiator which behaves according to the Stefan-Boltzman Law of black body radiation which states that the radiation emitted by a black body is proportional to the fourth power of its absolute temperature. A relatively small rise in black body temperature yields a steep increase in radiated energy as may be appreciated from the curve plotted in FIG. 9 illustrating this fourth-power relationship.

It will be appreciated that the structure of the solar oven disclosed herein is optimized for radiant heating of objects or foodstuff placed within the oven cavity 32, as opposed to heating by conduction through a stagnant airmass trapped in the oven cavity. This is achieved by elevating the walls 28 of the oven unit to a higher temperature then has been achieved in the past to thereby maximize the benefits derivable from the laws of black body radiation. Thus, the walls 28 are canted so as to all be exposed to solar radiation simultaneously, and further angled in relation to the external reflectors 52 so as to receive an augmented amount of solar radiation substantially at right angles to the walls 28. The exterior surface 28A of the walls 28 and bottom 34 are advantageously polished to a high degree, so as to minimize radiation of heat from the walls 28 to the outside of the chamber of the chamber 32. The chamber is further insulated, as has been explained, by the cavity space 38 which may advantageously be filled with suitable fibrous or other thermally insulating material.

Due to the high chamber temperatures obtainable by the present device, it is prudent to include a thermally sensitive device such as shown in FIG. 7 and which includes a spring 60, supported at its lower end by a bracket 62 affixed to the corner defined by two chamber walls 28 and further supported along an intermediate portion between two brackets 64. In a normal condition of the device the spring 60 is held in a compressed state by a fusible link 66 extending between the two brackets and to the spring 60. The fusible link 62 may be of a suitable eutectic alloy e.g. a tin-lead alloy which melts at relatively low temperatures. Upon reaching the melting point of the link 66 within the chamber cavity the spring 60 is released from its compressed state upwardly against the lower glass sheet 40 of the cover 16, thus raising the cover 16 away from the cavity walls 28 by a small distance, sufficient however to create a vent or port opening for freeing overheated air from the chamber cavity, thus limiting the temperature rise within the oven chamber.

An alternate temperature control device 70 is illustrated in FIG. 8 and consists of a bi-metallic strip affixed at two ends 72 to the chamber walls 28 at a corner of the oven chamber. The bi-metallic strip 70 is dimensioned and configured such that in a normal condition it does not interfere with the cover 16 resting upon the flanges 31 of the chamber unit 26. At an elevated temperature, the bi-metallic strip 70 as is known, bends in this case upwardly into an arc which acts against the underside of the translucent cover 16 resting upon the flanges 31, thus raising the cover away from the chamber walls and again creating a port opening or vent aperture for limiting temperature rise within the oven chamber.

The external reflector unit 18 may be constructed of reflecting polymer film such as is commercially available, cut, folded and stapled or glued to a backing material to make the structure 18. It will be appreciated that the materials used to make the solar oven 10 are of low cost and easy to work with by relatively unskilled persons. The oven chamber 26 may be formed of either steel or aluminum cut and spot welded to the desired shape, or in the alternative may be drawn from a single sheet of metal by means of suitable tool and die operations in a press.

As shown in FIG. 2, the solar oven 10 is easily tilted to whatever angle optimizes a reception of maximum solar radiation by the unit, simply propping up one side of the container 14 by a stone 15 or any suitable object that may be at hand. Other tilting means may be similarly provided and employed, such as providing an arcuate support surface under or integral with the oven enclosure 14.

The particular embodiments described and illustrated are shown for purposes of clarity only, and not by way of limitation. It is intended that the scope of the invention be defined only by the following claims.

We claim:
1. A solar oven comprising a plurality of canted sidewalls defining a heating chamber of inverted pyramidal configuration having a rectangular upper aperture for admitting solar radiation into said chamber, a closed bottom, said side walls having four blackened non-reflective interior surfaces and translucent means closing said upper aperture for containing heated air within said chamber, said four interior surfaces being exposed to radiation entering said chamber through said translucent means, a frusto-pyramidal reflector removably mounted externally of said heating chamber and including four reflector surfaces diverging from each other at a somewhat greater angle than said interior surfaces such that light falling onto said external reflector substantially normally to said translucent means is reflected onto an opposite one of said interior surfaces substantially at right angles thereto; and temperature responsive means arranged for opening a vent into said chamber in response to temperature rising in said chamber beyond a predetermined level, said temperature responsive means comprising spring means retained in a compressed state by structural means selected to lose structural integrity near said predetermined level, said spring means being released upon said structural means losing structural integrity near said predetermined level and failing under load imposed by said spring means, whereby said spring means is free to operate to open said vent.

2. The article of claim 1 wherein said temperature responsive means comprise spring means retained in a compressed state by fusible means selected to have a melting point near said predetermined level, said spring means being released upon melting of said fusible means and operating to open said vent.

3. The combination of claim 1 in which said structural means is a fusible alloy of predetermined melting point.

4. The combination of claim 1, in which said structural means is biodegradable under the influence of said predetermined temperature.

5. A solar oven comprising a plurality of canted sidewalls defining a heating chamber of inverted pyramidal configuration having an upper aperture for admitting solar radiation into said chamber, a closed bottom, said side walls having non-reflective interior surfaces, translucent means closing said upper aperture for containing heated air within said chamber, and temperature responsive means for lifting said translucent means away from said side walls to open said heating chamber, said temperature responsive means comprising spring means retained in a compressed state by structural means selected to lose structural integrity near said predetermined level, said spring means being released upon said structural means losing structural integrity near said predetermined level and failing under load imposed by said spring means, whereby said spring means is free to operate to open said heating chamber.

* * * * *